United States Patent
Huang et al.

(10) Patent No.: US 8,247,996 B2
(45) Date of Patent: Aug. 21, 2012

(54) BACKLIGHT DRIVING SYSTEM UTILIZING ONE PWM CONTROLLER TO CONTROL TWO BACKLIGHT UNITS SEPARATELY

(75) Inventors: Wei-Chi Huang, Jhongli (TW);
Cheng-Ta Lin, Jhongli (TW);
Tsung-Liang Hung, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 378 days.

(21) Appl. No.: 12/732,198

(22) Filed: Mar. 26, 2010

(65) Prior Publication Data
US 2010/0289425 A1  Nov. 18, 2010

(30) Foreign Application Priority Data
May 14, 2009  (CN) .......................... 2009 2 0303170

(51) Int. Cl.
*G05F 1/00* (2006.01)

(52) U.S. Cl. ........ 315/294; 315/295; 315/307; 315/224; 315/209 R; 315/312; 345/102; 345/212; 363/95; 363/98

(58) Field of Classification Search .............. 315/209 R, 315/291, 224, 307, 312, 225, 169.1, 169.3, 315/250, 246, 294, 295, 297; 345/77, 84, 345/87, 92, 102, 212; 363/21.09, 21.1, 21.11, 363/95, 98

See application file for complete search history.

(56) References Cited

U.S. PATENT DOCUMENTS

| 7,205,724 | B2 * | 4/2007 | Ahn et al. ................. 315/209 R |
| 7,304,633 | B2 * | 12/2007 | Kim et al. ..................... 345/102 |
| 7,515,445 | B2 * | 4/2009 | Lin ................................ 363/98 |
| 7,876,058 | B2 * | 1/2011 | Price et al. .................... 315/291 |

* cited by examiner

*Primary Examiner* — Haiss Philogene
(74) *Attorney, Agent, or Firm* — Altis Law Group, Inc.

(57) ABSTRACT

A backlight driving system comprises a first inverter circuit, a second inverter circuit, a pulse width modulation (PWM) controller, a frequency regulator and a switch circuit. The pulse width modulation (PWM) controller generates an illumination signal to control the first and second inverter circuits to illuminate first and second backlight units in response to a first enable signal, and generates a maintaining signal to control the first and second inverter circuits to maintain stable lighting of the first and second backlight units in response to a first feedback signal. The frequency regulator controls the PWM controller to generate the illumination signal and the maintaining signal in response to a second enable signal and a second feedback signal, respectively. The switch circuit connects the PWM controller to the second inverter circuit in response to the second enable signal.

9 Claims, 2 Drawing Sheets

BACKLIGHT DRIVING SYSTEM UTILIZING ONE PWM CONTROLLER TO CONTROL TWO BACKLIGHT UNITS SEPARATELY

BACKGROUND

1. Technical Field

Embodiments of the present disclosure relate to backlight driving systems, and particularly to a backlight driving system operable to utilize one pulse width modulation (PWM) controller to control two backlight units separately.

2. Description of Related Art

In small displays, two backlight units are commonly used to provide luminance, which are driven by one or two inverter circuits that are controlled by a single pulse width modulation (PWM) controller. The two backlight units are turned on/off simultaneously and both keep lighting when the display is operating. Obviously, this wastes power when the display is in a low-brightness mode. Additionally, such wastage will shorten the life cycle of the two backlight units.

Although the two backlight units can be controlled separately by employing two PWM controllers, product cost and power consumption of the displays will inevitably increase.

BRIEF DESCRIPTION OF THE DRAWINGS

Many aspects of the embodiments can be better understood with references to the following drawings, wherein like numerals depict like parts, and wherein.

DETAILED DESCRIPTION

Figure 1:
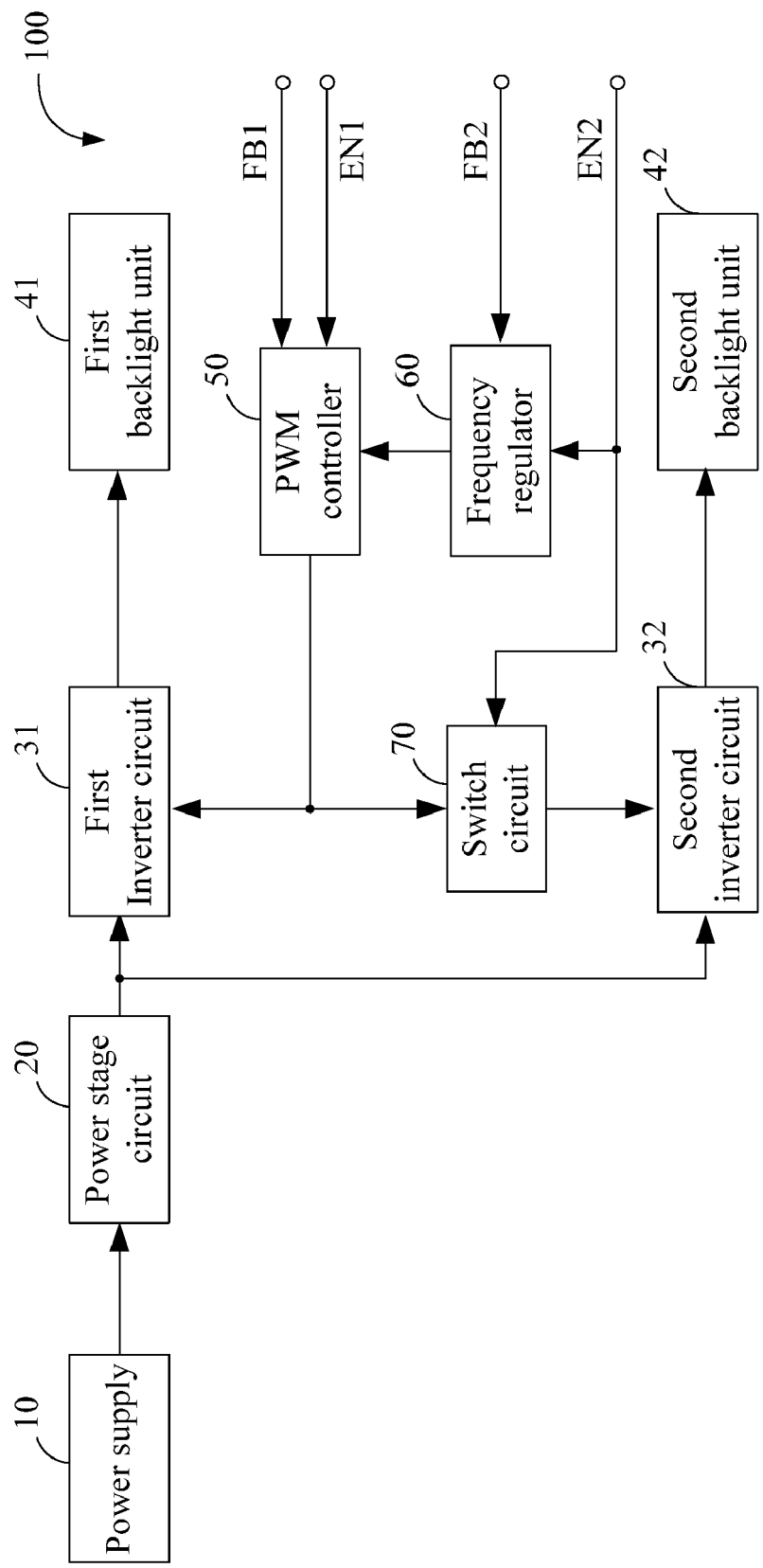
FIG. 1 is a block diagram of a backlight driving system of one embodiment of the present disclosure.

Referring to FIG. 1, a backlight driving system 100 according to one embodiment of the present disclosure is shown. The backlight driving system 100 is used to drive a first backlight unit 41 and a second backlight unit 42. In the embodiment, the backlight driving system 100 comprises a power supply 10, a power stage circuit 20, a first inverter circuit 31, a second inverter circuit 32, a pulse width modulation (PWM) controller 50, a frequency regulator 60 and a switch circuit 70. Each of the first and second backlight units 41 and 42 comprises at least one lamp, such as cold cathode fluorescent lamps (CCFLs), discharge lamps, or light emitter diodes (LEDs), for example.

In one embodiment, the power supply 10 may be a commercial power source to provide commercial power signals. In other embodiments, the power supply 10 can be selected alternating current (AC) power capable of providing AC signals. The commercial power signals are converted into direct current (DC) signals via the power stage circuit 20. The first inverter circuit 31 converts the DC signals into AC signals to drive the first backlight unit 41 under control of the PWM controller 50. The second inverter circuit 32 also converts the DC signals into the AC signals to drive the second backlight unit 42 under control of the PWM controller 50.

The PWM controller 50 receives a first enable signal EN1 and a first feedback signal FB1, and generates an illumination signal in response to the first enable signal EN1 and a maintaining signal in response to the first feedback signal FB1. Both the illumination signal and the maintaining signal are PWM signals generated by the PWM controller 50. The illumination signal is used to control the first and second inverter circuit 31 and 32 to illuminate the first and second backlight units 41 and 42. The maintaining signal is used to control the first and second inverter circuit 31 and 32 to maintain stable lighting of the first and second backlight units 41 and 42. In the embodiment, the PWM controller 50 comprises an oscillator 51 (shown in FIG. 2) to provide a reference frequency.

The frequency regulator 60 receives a second enable signal EN2 and a second feedback signal FB2, and controls the PWM controller 50 to generate the illumination signal in response to a second enable signal EN2 and also to generate the maintaining signal in response to a second feedback signal FB2. In the embodiment, the frequency regulator 60 controls the outputs of the PWM controller 50 by regulating the reference frequency of the PWM controller 50 (detailed described in FIG. 2).

The switch circuit 70 connects the second inverter circuit 32 to the PWM controller 50 responding to a second enable signal EN2. In the embodiment of the present disclosure, controllable switches, such as bipolar junction transistors (BJTs), or field effect transistors (FETs), for example, configure the switch circuit 70.

In the embodiment, the first and second enable signals EN1 and EN2 are defined to illuminate the first and second backlight units 41 and 42, respectively. The first and second enable signals EN1 and EN2 are generated by a function circuit, such as an on-off circuit, a dimming circuit, a brightness control circuit and a standby circuit of the a display automatically or manually. The first and second feedback signals FB1 and FB2 represent current flowing through the first and second backlight units 41 and 42, respectively. The first and second feedback signals FB1 and FB2 generate when the first and second backlight units 41 and 42 are illuminated successfully.

In response to the illumination signal, the first and second inverter circuits 31 and 32 convert the DC signals into the AC signals with a first voltage to illuminate the first and second backlight units 41 and 42. In response to the maintaining signal, the first and second inverter circuits 31 and 32 convert the DC signals into the AC signals with a second voltage to maintain stable lighting of the first and second backlight units 41 and 42.

In one embodiment, the lamps of the first and second backlight units 41 and 42 comprises cold cathode fluorescent lamps (CCFLs), which needs to be illuminated at a higher voltage (e.g. 1000-2000 Vrms) than be maintained (e.g. 500-1000 Vrms) to light stably. In the embodiment, frequency of the illumination signal (e.g. 70 KHz) is greater than frequency of the maintaining signal (e.g. 50 KHz). Consequently, the first voltage of the AC signal responding to the illumination signal is higher than the second voltage of the AC signal responding to the maintaining signal. Therefore, the AC signal with the first voltage is determined to illuminate the first and second backlight units 41 and 42. The AC signal with the second voltage is determined to maintain stable lighting of the first and second backlight units 41 and 42.

If one backlight unit is able to provide enough luminance for the display, only the first backlight unit 41 requires to be started by the first enable signal EN1. The PWM controller 50 receives the first enable signal EN1 and generates the illumination signal accordingly. As the second enable signal EN2 is not input, the switch circuit 70 disconnects the PWM controller 50 to the second inverter circuit 32. Therefore, the illumination signal only transmits to the first inverter circuit 31. In response to the illumination signal, the first inverter circuit 31 converts the DC signals into the AC signals with the first voltage to illuminate the first backlight unit 41.

When the first backlight unit 41 is illuminated successfully, the first feedback signal FB1 representing the current flowing through the first backlight unit 41 is generated. The PWM controller 50 receives the first feedback signal FB1, and generates the maintaining signal to control the first inverter circuit 31 accordingly. In response to the maintaining signal, the first inverter circuit 31 converts the DC signals into the AC signals with the second voltage to maintain stable lighting of the first backlight unit 41. In the embodiment, users can utilize the dimming circuit or the brightness control circuit of the display to regulate the luminance of the first backlight unit 41 individually.

If the display requires more luminance or more balanced brightness than the first backlight unit 41 can provide, the second backlight unit 42 can be further illuminated by the second enable signal EN2. Both the frequency regulator 60 and the switch circuit 70 receive the second enable signal EN2. In response to the second enable signal EN2, the frequency regulator 60 controls the PWM controller 50 to generate the illumination signal instead of the maintaining signal (detailed described in FIG. 2), the switch circuit 70 connects the PWM controller 50 to the second inverter circuit 32. Thus, the second inverter circuit 32 receives the illumination signal, and converts the DC signals into the AC signals with the first voltage to illuminate the second backlight unit 42.

When the second backlight unit 42 is illuminated successfully, the second feedback signal FB2 representing the current flowing through the second backlight unit 42 is generated to the frequency regulator 60. In response to the second feedback signal FB2, the frequency regulator 60 controls the PWM controller 50 to generate the maintaining signal instead of the illumination signal (detailed described in FIG. 2). Accordingly, the second inverter circuit 32 receives the maintaining signal, and converts the DC signals into the AC signals with the second voltage to maintain stable light of the second backlight unit 42 accordingly. In the embodiment, users can utilize the dimming circuit or the brightness control circuit of the display to regulate the luminance of the first and second backlight units 41 and 42 synchronically.

Additionally, the first and second backlight units 41 and 42 can be started synchronically if the first and second enable signals EN1 and EN2 are input simultaneously. In response to the first enable signal EN1, the PWM controller 50 generates the illumination signal. In response to the second enable signal EN2, the switch circuit 70 connects the PWM controller 50 to the second inverter circuit 32. Both the first inverter circuit 31 and the second inverter circuit 32 receive the illumination signal, and converts the DC signals into the AC signals with the first voltage to illuminate the first and second backlight units 41 and 42, respectively.

When the first and second backlight units 41 and 42 are illuminated successfully, the first and second feedback signals FB1 and FB2 are generated to represent the currents flowing through the first and second backlight units 41 and 42, respectively. The PWM controller 50 receives the first feedback signal FB1, and generates the maintaining signal accordingly. The first and second inverter circuits 31 and 32 receive the maintaining signal, and convert the DC signals into the AC signals with the second voltage to maintain stable lighting of the first and second backlight units 41 and 42, respectively.

If the luminance provided by only one backlight unit is enough for the display while the first and second backlight units 41 and 42 are lighting, the second backlight unit 42 can turn off by stopping the second enable signal EN2. When the second enable signal EN2 is stopped, the switch circuit 70 disconnects the PWM controller 50 and the second inverter circuit 32. The second inverter circuit 32 cannot receive the maintaining signal, and stops conversion. Thus, the second backlight unit 42 turns off.

Additionally, the first backlight unit 41 can turn off by stopping the first enable signal EN1. When the first enable signal EN1 is stopped, the PWM controller 50 stops generating the maintaining signal. Therefore, the first inverter circuit 31 cannot receive the maintaining signal, and stops conversion. Thus, the second backlight unit 41 turns off.

If the display is turned off or operates in a standby mode requiring no luminance, the first and second backlight units 41 and 42 can be turned off synchronically by stopping the first enable signal EN1. When the first enable signal EN1 is stopped, the PWM controller 50 stops generating the maintaining signal. Therefore, both the first inverter circuits 31 and the second inverter circuit 32 cannot receive the maintaining signal, and stop conversion. Thus, the first and second backlight units 41 and 42 turn off.

As mentioned above, the backlight driving system 100 is operable to turn on/off the first and second backlight units 41 and 42 successively or synchronically. Thus, separate controls of the first and second backlight units 41 and 42 are implemented by the backlight driving system 100 only utilizing the PWM controller 50.

Figure 2:
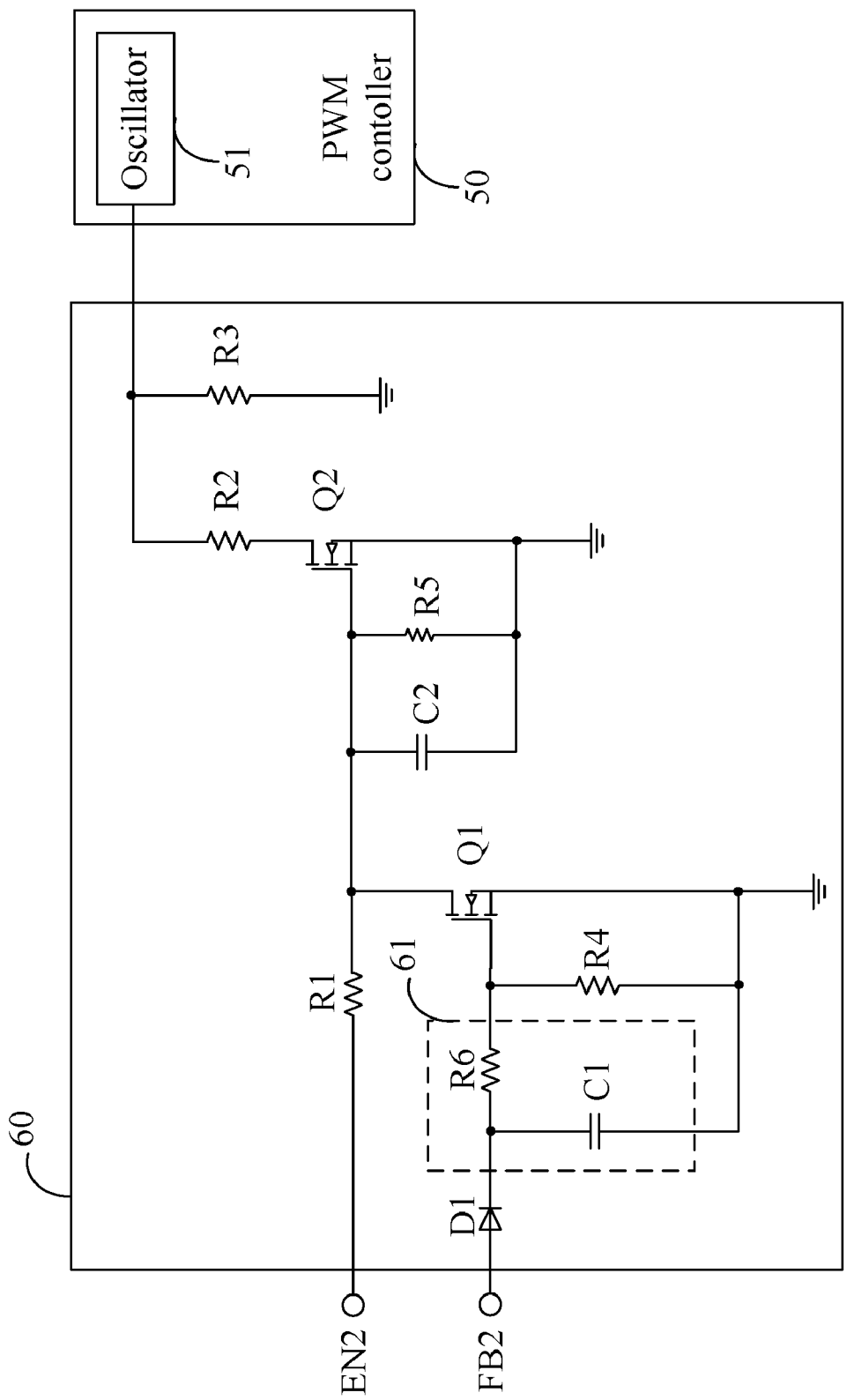
FIG. 2 is a detailed circuit diagram of one embodiment of a frequency regulator shown in FIG. 1.

Referring to FIG. 2, a detailed circuit diagram of one embodiment of the frequency regulator 60 is shown. In the embodiment, the frequency regulator 60 comprises a first transistor Q1, a second transistor Q2, a first resistor R1, a second resistor R2, a third resistor R3, a forth resistor R4 and a fifth resistor R5. The first transistor Q1 comprises a gate to receive the second feedback signal FB2, a drain to receive the second enable signal EN2 via the first resistor R1, and a source grounded. The second transistor Q2 comprises a gate connected to the drain of the first transistor Q1, a drain connected to the oscillator 51 of the PWM controller 50 via the second resistor R2, and a source grounded. The third resistor R3 is connected between the oscillator 51 of the PWM controller 50 and the ground. The fourth resistor R4 is connected between the gate and source of the first transistor Q1. The fifth resistor R5 is connected between the gate and source of the second transistor Q2.

In response to the second enable signal EN2, the frequency regulator 60 regulates the reference frequency of the PWM controller 50 by connecting the third resistor R3 singly. In response to the second feedback signal FB2, the frequency regulator 60 regulates the reference frequency of the PWM controller 50 by connecting the second resistor R2 and the third resistor R3 in parallel to the oscillator 51 of the PWM controller 50.

When the third resistor R3 singly connects to the oscillator 51 of the PWM controller 50, the oscillator 51 has a first load resistance equal to the third resistor R3, and provides a first reference frequency for the PWM controller 50. Accordingly, the PWM controller 50 generates the PWM signal with a first frequency.

When the second resistor R2 and the third resistor R3 are connected in parallel to the oscillator 51, the oscillator 51 has a second load resistance equal to the parallel resistance of the second resistor R2 and the third resistor R3, and provides a second reference frequency for the PWM controller 50. Accordingly, the PWM controller 50 generates the PWM signal with a second frequency.

As the first load resistance is larger than the second load resistance, the first reference frequency is lower than the second reference frequency. Therefore, the second frequency of the PWM signal is greater than the first frequency thereof. In the embodiment, the PWM signal with the second frequency is defined as the illumination signal, and the PWM signal with the first frequency is defined as the maintaining signal.

As described above, the frequency regulator 60 receives the second enable signal EN2, which is transmitted to the gate of the second transistor Q2 via the first resistor Q1. In the embodiment, the second enable signal EN2 is at high logical level (e.g., logical 1). Therefore, the second transistor Q2 turns on, and the second resistor R2 connects to the ground. Thus, the second resistor R2 and the third resistor R3 are connected in parallel to the oscillator 51 of the PWM controller 50. Accordingly, the PWM controller 50 generates the illumination signal to control the second inverter circuit 32 to illuminate the second backlight unit 42.

When the second backlight unit 42 is illuminated successfully, the second feedback signal FB2 representing the current flowing through the second backlight unit 42 is generated. As described above, the frequency regulator 60 receives the second feedback signal FB2, which transmits to the gate of the first transistor Q1. In the embodiment, the second feedback signal FB2 is at high logical level. Therefore, the first transistor Q1 turns on and the second enable signal EN2 flows to the ground rather than the gate of the second transistor Q2. Thus, the second transistor Q2 turns off and the second resistor R2 disconnects at the ground. As the third resistor R3 singly connects to the oscillator 51 of the PWM controller 50, the PWM controller 50 generates the maintaining signal to control the first and second inverter circuits 31 and 32 to maintain stable lighting of the first and second backlight units 41 and 42.

In one embodiment, the frequency regulator 60 further comprises a diode D1 to prevent the second feedback signal FB2 from flowing reversely. The diode D1 comprises an anode to receive the second feedback signal FB2, and a cathode to output the second feedback signal FB2.

In one embodiment, the frequency regulator 60 further comprises a filter circuit 61 connected between the diode D1 and the gate of the first transistor Q1 to filter the second feedback signal FB2. The filter circuit 61 comprises a sixth resistor R6 and a first capacitor C1. The sixth resistor R6 is connected between the cathode of the diode D1 and the gate of the first transistor Q1. The first capacitor C1 has one end connected between a junction of the diode D1 and the sixth resistor R6, and the other end grounded.

In one embodiment, the frequency regulator 60 further comprises a second capacitor C2 connected between the gate of the second transistor Q2 and the ground to delay the second enable signal. If the second backlight unit 42 is heated (for example, being heated by the first backlight unit 41, which maintains lighting, or being turned off just a while), the second backlight unit 42 can be illuminated by the AC signals with the second voltage. Therefore, there is no need for the PWM controller 50 to generate the illumination signal. When the frequency regulator 60 receives the second enable signal EN2, the capacitor C2 delays the transmission of the second enable signal EN2 to the gate of the second transistor Q2 for a while (e.g. 100 ms). In response to the second enable signal EN2, the switch circuit 70 connects the PWM controller 50 to the second inverter circuit 32. The second inverter circuit 32 receives the maintaining signal, and converts the DC signals into the AC signals with the second voltage to illuminate the second backlight unit 42.

When the second backlight unit 42 is illuminated successfully, the second feedback signal FB2 representing the current flowing through the second backlight unit 42 is generated. The frequency regulator 60 receives the second feedback signal FB2, and the first transistor Q1 turns on accordingly. Therefore, the second enable signal EN2 flows to the ground via the first transistor Q1. Obviously, the frequency regulator 60 does not regulate the reference frequency of the PWM controller 50. Thus, the second backlight unit 42 is illuminated by the AC signals with the second voltage rather than the first voltage, and the backlight driving system 100 consumes less power.

If the second backlight unit 42 is not heated enough to be illuminated by the AC signals with the second voltage, then the second feedback signal FB2 will not be generated. Accordingly, the second enable signal EN2 is transmitted to the gate of the second transistor Q2 after delay. Thus, the reference frequency of the PWM controller 50 is regulated. Therefore, the PWM controller 50 generates the illumination signal to control the second inverter circuit 32 to illuminate the second backlight unit 42.

It is apparent that the embodiments of the present disclosure provide a backlight driving system operable to utilize one PWM controller to separately control the first and second backlight units. Obviously, the backlight driving system saves power by employing fewer components, prolongs work life of the first and second backlight units because of better utilization, and decreases cost with improved convenience.

It is believed that the present embodiments and their advantages will be understood from the foregoing description, and it will be apparent that various modifications, alternations, and changes may be made thereto without departing from the spirit and scope of the present disclosure, the examples hereinbefore described merely being preferred or exemplary embodiments of the present disclosure.

What is claimed is:

1. A backlight driving system to drive a first backlight unit and a second backlight unit, comprising:
    a first inverter circuit to convert direct current (DC) signals into alternating current (AC) signals to drive the first backlight unit;
    a second inverter circuit to convert the DC signals into the AC signals to drive the second backlight unit;
    a pulse width modulation (PWM) controller to generate an illumination signal to control the first and second inverter circuits to illuminate the first and second backlight units in response to a first enable signal, and to generate a maintaining signal to control the first and second inverter circuits to maintain stable lighting of the first and second backlight units in response to a first feedback signal;
    a frequency regulator to control the PWM controller to generate the illumination signal and the maintaining signal in response to a second enable signal and a second feedback signal, respectively; and
    a switch circuit to connect the PWM controller to the second inverter circuit in response to the second enable signal;
    wherein the first and second feedback signals represent current flowing through the first and second backlight units, respectively.

2. The backlight driving system as claimed in claim 1, wherein frequency of the illumination signal is greater than frequency of the maintaining signal.

3. The backlight driving system as claimed in claim 1, wherein the PWM controller comprises an oscillator to provide a reference frequency.

4. The backlight driving system as claimed in claim 3, wherein the frequency regulator comprises:
    a first transistor comprising a gate to receive the second feedback signal, a drain to receive the second enable signal via a first resistor, and a source grounded;

a second transistor comprising a gate connected to the drain of the first transistor, a drain connected to the oscillator of the PWM controller via a second resistor, and a source grounded;

a third resistor connected between the oscillator of the PWM controller and the ground;

a fourth resistor connected between the gate and source of the first transistor; and a fifth resistor connected between the gate and source of the second transistor.

5. The backlight driving system as claimed in claim 4, wherein the frequency regulator further comprises a diode to prevent the second feedback signal from flowing reversely, wherein the diode comprises an anode to receive the second feedback signal, and a cathode to output the second feedback signal.

6. The backlight driving system as claimed in claim 5, wherein the frequency regulator further comprises a filter circuit connected between the diode and the gate of the first transistor to filter the second feedback signal, wherein the filter circuit comprises:

a sixth resister connected between the cathode of the diode and the gate of the first transistor;

a first capacitor comprising one end connected between a junction of the diode and the sixth resister, and the other end grounded.

7. The backlight driving system as claimed in claim 4, wherein the frequency regulator further comprises a second capacitor connected between the gate of the second transistor and the ground to delay the second enable signal.

8. The backlight driving system as claimed in claim 1, wherein each of the first and second backlight units comprises at least one lamp.

9. The backlight driving system as claimed in claim 1, further comprising:

a power supply to provide commercial power signals; and a power stage circuit to convert the commercial power signals into the DC signals.

* * * * *